No. 670,757. Patented Mar. 26, 1901.
J. W. BARNES.
ANIMAL TRAP.
(Application filed Oct. 11, 1900.)
(No Model.)
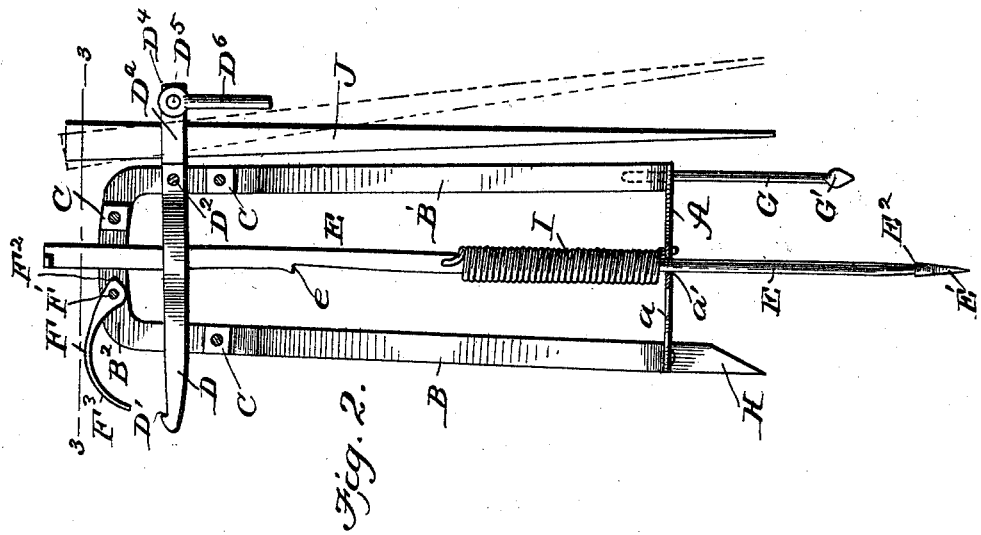
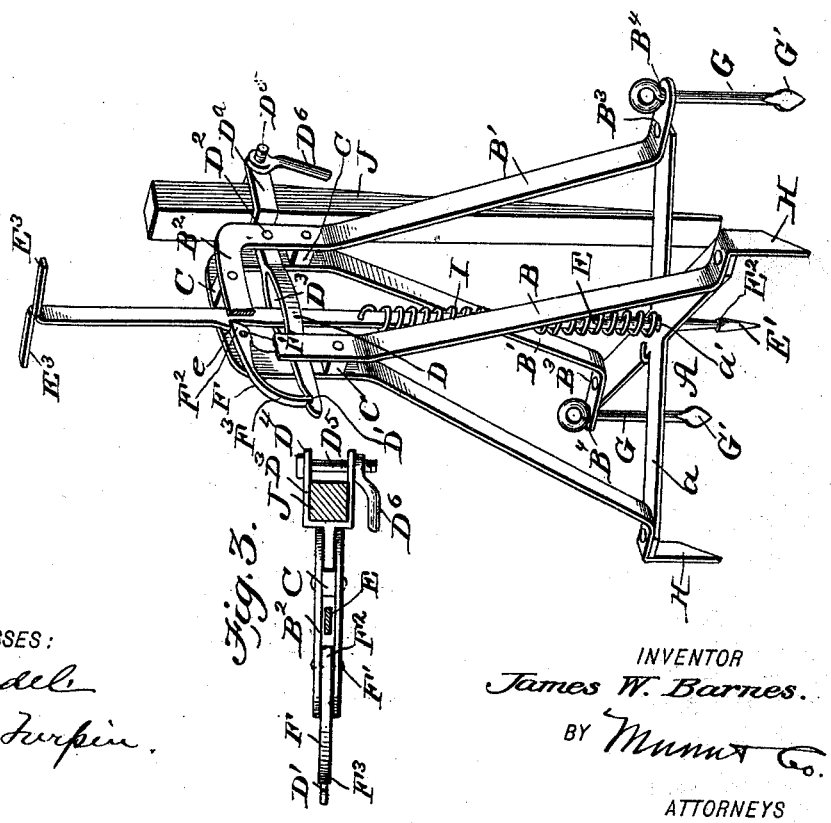
WITNESSES:
INVENTOR
James W. Barnes.
BY Munn & Co.
ATTORNEYS
THE NORRIS PETERS CO., PHOTO-LITHO., WASHINGTON, D. C.

UNITED STATES PATENT OFFICE.

JAMES WILSON BARNES, OF BEAVERTON, OREGON.

ANIMAL-TRAP.

SPECIFICATION forming part of Letters Patent No. 670,757, dated March 26, 1901.

Application filed October 11, 1900. Serial No. 32,698. (No model.)

*To all whom it may concern:*

Be it known that I, JAMES WILSON BARNES, residing at Beaverton, in the county of Washington and State of Oregon, have made certain new and useful Improvements in Animal-Traps, of which the following is a specification.

My invention is an improvement in animal-traps, and is especially designed for trapping animals, such as moles and gophers, which burrow along slightly below the surface of the ground; and the invention consists in certain novel constructions and combinations of parts, as will be hereinafter described and claimed.

In the drawings, Figure 1 is a perspective view of my improved trap. Fig. 2 is a sectional side elevation thereof, and Fig. 3 is a sectional top plan view on about line 3 3 of Fig. 2.

My trap is shown as comprising a frame having a base A, side frames B, each of which has uprights B', and a crown or arch portion $B^2$, connecting its uprights, the frames being spaced apart at their upper ends by blocks C and receiving between them the trigger-lever D, the spear-shank E, and the latch F. The base A is in the shape of a cross having the arms $a$ and provided at its center with the opening $a'$ for the spear. At their lower ends the uprights B' are bent, forming feet $B^3$, which are lapped upon and secured to the ends of the arms $a$ of the base A. One of the feet $B^3$ is extended laterally and is provided with a guide-opening $B^4$ for the movable anchor G, while the other foot $B^3$ has a downwardly-bent extension which forms a fixed anchor-bar H, as shown. It will be noticed that I furnish one fixed and one movable anchor-bar on each side of the base of the trap; also, that the movable anchors G are provided at their lower ends with arrow-heads G' and are supported so they can when forced downward into the ground to their full depth be then turned so the shoulders of the arrow-heads will resist the withdrawal of the anchors G, as will be understood from Fig. 1 of the drawings.

It will be noticed that the uprights B' are inclined inwardly toward each other to a point near their upper ends and near where they merge in the arch portion $B^2$ and are separated by the blocks C, thus presenting a construction embodying strut-like braces, which tend to give strength and rigidity to the frame and at the same time avoid any unnecessary weight.

The spear has its shank E movable longitudinally in the opening $a'$ in the base A and approximately fits said opening, excluding light from above at the center of the base A. The spear has the head E' tapering gradually to a point and shouldered at $E^2$ to better hold the animal when pierced. This shoulder $E^2$ is of a proper diameter to pass through the opening $a'$ in the base A. At its upper end the spear-shank E passes between the arch portions of the opposite frames and between one of the blocks C and the latch F, and the upper end of the spear is slitted longitudinally, forming sections $E^3$, which are bent at right angles to each other, as shown in Fig. 1, to form a handle by which the spear may be raised in setting the trap. The shank E is provided at $e$ with a shoulder for engagement by the latch F, as shown in Fig. 1. This latch F is in the form of a lever pivoted near one end at F', providing the short arm $F^2$ and the long arm $F^3$. The short arm $F^2$ engages with the shoulder $e$ of the spear when the trap is set, as shown in Fig. 1, while the long arm $F^3$ is curved downwardly from the pivot F' to the extremity of such long arm, where the latter engages with a seat D' near the outer end of the lever D. This lever D is the trigger, and it is pivoted at $D^2$ and has its long arm, which bears the seat D', provided with an opening $D^3$, through which the spear passes and in which such spear is guided, as will be understood from Fig. 1. If the trap is set, as shown in Fig. 1, and the arm of the lever bearing the seat D' is depressed, it is manifest the latch F will be released and the spear will be forced downward by the action of the spring I, which spring is shown in the form of a coil-spring encircling the spear-shank, secured at its upper end thereto and at its lower end to the base A.

The short arm of the trigger D is provided with the tripping-bar J, which extends downwardly from the trigger and is movable at its lower end in a lateral direction or laterally toward and from the spear. By this means I am able to operate the trap by a lateral movement of the mole instead of by an upward movement, as is common in traps of this class. In addition to arranging the tripping-bar J to move laterally with respect to the spear in springing the trap I also prefer to provide for adjusting the tripping-bar laterally with respect to the spear, so it can be set to properly trap larger or smaller moles. To this end the short arm of the tripping-lever is provided with a clamp in which the upper end of the tripping-bar is adjustably held. The clamp preferably includes a box $D^a$, which embraces the bar J and has its ends $D^4$ connected by a bolt $D^5$, whose nut $D^6$ may be tightened to secure the tripping-bar in any desired adjustment, as will be understood from the drawings.

In operation the trap is set over the run or mound of the animal with the lower end of the tripping-bar J projecting slightly into the mound, so that the animal as it comes forward through the mound below the spear-head, which has been raised to the position shown in Fig. 1, will push dirt forward against the lower end of the tripping-bar J, pressing such end of the bar in a direction away from the spear, and thus rocking the trigger-lever D to cause it to release the latch F, which will in turn release the spear, so the latter may be operated by the spring downward to pierce the animal. The animals being of different length, the adjustment of the tripping-bar J enables it to be set with such relation to the spear as to cause the latter to pierce the animal in a vital spot.

The trap, while useful for moles, is especially useful and adapted for gophers. The tripping-bar may be set with its lower end in front of the hole, and when the gopher finds his way blocked he immediately begins to stop up the hole, throwing dirt down in front of the tripping-bar and going back for more until he has accumulated enough, when by pushing it forward he will move the tripping-bar and release the detent devices for the spear. By adjusting the tripping-bar in its connection with the trigger-lever it can be readily set to trap a long or a short animal.

Having thus described my invention, what I claim as new, and desire to secure by Letters Patent, is—

1. An animal-trap consisting of the frame composed of side frames having upright portions and arch portions connecting the same, spacing-blocks between the arch portions, and the base-frame to which the lower ends of the uprights are connected, the spear having a shoulder, the latch pivoted between the side frames and arranged at one end to secure the spear in set position, the trigger consisting of a lever having one arm provided with a guide-opening for the spear and with a seat for the latch and having its other arm provided with a clamp, and the tripping-bar held at one end in said clamp and arranged at its other end to be movable laterally with respect to the spear substantially as set forth.

2. In an animal-trap substantially as described the combination of the framing comprising the side frames, the base-frame and means for spacing the side frames apart at their upper ends, the spear, the latch, and the trigger-lever operating between the side frames the trigger-lever being provided with an opening forming a guide for the spear, and the trigger-bar connected with the trigger-lever and arranged for operation substantially as set forth.

3. An animal-trap substantially as described comprising the framing, the spear, the latch, the trigger-lever arranged at one end to secure the latch and having its other end provided with a clamp composed of a box and a bolt and nut, and the trigger-bar held in said clamp substantially as set forth.

4. The improved trap herein described comprising the base, the side frames having upright portions, and arch portions, the latter being spaced apart, and the uprights being provided at their lower ends with feet which lap upon the base, one of the feet of each side frame being provided with a downwardly-bent fixed anchor portion, and the other with a laterally-extended portion provided with an opening for the anchor-bar, the movable anchor-bars movable longitudinally and rotatably in said opening and provided at their lower ends with arrow-heads, the spear, and detent mechanism therefor including a tripping-bar which is movable laterally to release the spear substantially as set forth.

5. An animal-trap comprising a spear, actuating means therefor, and detent means including a tripping-bar which is movable laterally with respect to the spear in tripping the detent and is also adjustable longitudinally and laterally with respect to the spear, substantially as set forth.

6. The animal-trap, comprising the frame, the spear, means for actuating the spear, the latch arranged at one end to secure the spear, and the detent-lever arranged at one end to secure and release the latch and provided at its other end with the tripping-bar and straddling the spear between its ends, substantially as set forth.

7. In an animal-trap, the combination of the framing, spear, latch and trigger composed of an arm arranged at one end to secure the latch and provided at its other end with a clamp, and the tripping-bar held in said clamp and adjustable rockably and longitudinally, substantially as set forth.

8. The animal-trap herein described, comprising the frame, the spear, actuating means therefor, the latch arranged to secure the spear, the detent-lever arranged at one end to secure and release the latch and extended thence past the spear to the opposite side thereof and provided at its opposite end with means by which it may be operated substantially as set forth.

JAMES WILSON BARNES.

Witnesses:
H. H. PARKER,
GEO. H. WILLIAMS.